United States Patent [19]

Boyd, Jr.

[11] Patent Number: 4,528,485
[45] Date of Patent: Jul. 9, 1985

[54] ELECTRONICALLY COMMUTATED MOTOR, METHOD OF OPERATING SUCH, CONTROL CIRCUIT, LAUNDRY MACHINE AND DRIVE THEREFOR

[75] Inventor: John H. Boyd, Jr., Holland, Mich.
[73] Assignee: General Electric Company, Fort Wayne, Ind.
[21] Appl. No.: 367,951
[22] Filed: Apr. 13, 1982
[51] Int. Cl.³ .................... H02P 7/00; H02K 29/00
[52] U.S. Cl. ............................. 318/138; 318/254; 310/189; 310/200; 310/259
[58] Field of Search ............... 318/254, 254 A, 138, 318/281; 310/46, 184, 189, 198, 200, 156, 259, 216, 207

[56] References Cited

U.S. PATENT DOCUMENTS

| | | | |
|---|---|---|---|
| 2,519,895 | 8/1950 | Edwards | 310/156 X |
| 2,795,712 | 6/1957 | Shur | 310/198 |
| 3,153,183 | 10/1964 | Brammerlo | 310/184 |
| 3,274,471 | 9/1966 | Moczala | 318/138 |
| 3,290,572 | 12/1966 | Hartmann et al. | 318/138 |
| 3,304,481 | 2/1967 | Saussele | 318/138 |
| 3,329,852 | 7/1967 | Saussele | 318/138 |
| 3,369,381 | 2/1968 | Crane et al. | 68/12 |
| 3,475,668 | 10/1969 | Mieslinger | 318/138 |
| 3,488,566 | 1/1970 | Fukuda | 318/138 |
| 3,531,702 | 9/1970 | Hill | 318/138 |
| 3,599,062 | 8/1971 | Crane | 318/281 |
| 3,611,081 | 10/1971 | Watson | 318/138 |
| 3,634,873 | 1/1972 | Nishimura | 318/254 |
| 3,643,143 | 2/1972 | Rakes | 318/254 |
| 3,651,368 | 3/1972 | Hanada | 318/254 |
| 3,663,878 | 5/1972 | Miyasaka | 318/254 |
| 3,689,815 | 9/1972 | Thibaut | 318/281 |
| 3,780,363 | 12/1973 | Doemen et al. | 318/254 |
| 3,783,357 | 1/1974 | Ichiyanage | 318/138 |
| 3,829,749 | 8/1974 | Richt | 318/331 |
| 3,906,320 | 9/1975 | Doemen | 318/331 |
| 3,932,793 | 1/1976 | Muller | 318/138 |
| 3,938,014 | 2/1976 | Nakajima | 318/138 |
| 3,942,083 | 3/1976 | Takahashi et al. | 318/138 |
| 3,969,658 | 7/1976 | Htsui et al. | 318/202 |
| 3,986,086 | 10/1976 | Muller | 318/138 |
| 3,997,823 | 12/1976 | Machida | 318/138 |
| 4,004,202 | 1/1977 | Davis | 318/138 |
| 4,005,347 | 1/1977 | Erdman | 318/254 |
| 4,025,833 | 5/1977 | Lawton | 318/781 |
| 4,027,215 | 5/1977 | Knight et al. | 318/341 |
| 4,030,005 | 6/1977 | Doemen | 318/138 |
| 4,064,443 | 12/1977 | Yamada et al. | 318/331 |
| 4,162,435 | 7/1979 | Wright | 318/254 |
| 4,167,692 | 9/1979 | Sekiya et al. | 318/138 |
| 4,169,990 | 10/1979 | Erdman | 318/138 |
| 4,227,106 | 10/1980 | Druss | 310/184 |
| 4,250,435 | 2/1981 | Alley et al. | 318/138 |
| 4,250,544 | 2/1981 | Alley | 364/110 |
| 4,327,302 | 4/1982 | Hershberger | 310/156 |
| 4,404,485 | 9/1983 | Ban | 310/207 X |
| 4,426,771 | 1/1984 | Wang et al. | 29/596 |

FOREIGN PATENT DOCUMENTS

| | | |
|---|---|---|
| 1374991 | 9/1964 | France. |
| 1405208 | 5/1965 | France. |
| 57-71258 | 4/1982 | Japan .......................... 318/138 |

Primary Examiner—William M. Shoop, Jr.
Assistant Examiner—Patrick C. Keane
Attorney, Agent, or Firm—Joseph E. Papin

[57] ABSTRACT

An electronically commutated motor for energization by DC in both a high speed mode and a low speed mode at a current not significantly greater than a preselected level. The motor stator has a plurality of winding stages each with a plurality of winding turns only a first portion of which is commutated in a first sequence in a high speed mode and a predeterminately greater portion of which is commutated in a second sequence different from the first when the motor is energized in the low speed mode. A permanent magnet rotor is rotatably driven in one direction in the high speed mode so as to develop a first torque at the preselected current level when only the first portion of the winding turns of the winding stages are commutated in the first preselected sequence. In response to commutation in the second sequence of the predeterminately greater portion of the winding turns the rotor is rotatably driven alternately in opposite directions in the low speed mode so as to develop a second torque predeterminately greater than the first torque at a current not significantly greater than the preselected level. A method of operating such motor, a control circuit therefor and the use of such a motor in laundry machines and drives therefor are also disclosed.

57 Claims, 9 Drawing Figures

ELECTRONICALLY COMMUTATED MOTOR, METHOD OF OPERATING SUCH, CONTROL CIRCUIT, LAUNDRY MACHINE AND DRIVE THEREFOR

CROSS REFERENCE TO RELATED APPLICATIONS

This application is related to the following commonly assigned applications: Doran D. Hershberger application, Ser. No. 077,784, filed Sept. 21, 1979, (now U.S. Pat. No. 4,327,302); Harold B. Harms and David M. Erdmann application Ser. No. 141,268, filed Apr. 17, 1980, (now U.S. Pat. No. 4,390,826) David M. Erdmann applications Ser. No. 482,409, filed June 24, 1974 (now U.S. Pat. No. 4,005,347) and Ser. No. 802,484, filed June 1, 1977 (now U.S. Pat. No. 4,169,990) and Floyd H. Wright application Ser. No. 729,804, filed Oct. 5, 1976 (now U.S. Pat. No. 4,162,435). The entire disclosures of the foregoing are specifically incorporated herein by reference.

Field of the Invention

This invention relates in general to dynamoelectric machines and laundry apparatus and more particularly to an electronically commutated motor, a method of operating an electronically commutated motor, a control circuit, a laundry machine and a drive therefor incorporating such an electronically commutated motor.

BACKGROUND OF THE INVENTION

While conventional brush commutated DC motors have numerous advantageous characteristics such as convenience of changing operational speeds and direction of rotation, it is believed that there are disadvantages such as brush wear, electrical noise or RF interference caused by sparking between the brushes and the segmented commutator, that have limited their applicability in some fields such as in the domestic appliance fields. Brushless DC motors with electronic commutation and permanent magnet rotors have now been developed and generally are believed to have the advantageous characteristics of the brush-type motors without many of the disadvantages thereof and have other important advantages. Such electronically commutated motors are disclosed in the David M. Erdmann U.S. Pat. Nos. 4,005,347 and 4,169,990 and Floyd H. Wright U.S. Pat. No. 4,162,435. These motors may be advantageously employed in many different fields or motor applications among which are domestic commercial appliances, e.g., automatic washing or laundry machines such as disclosed in co-pending U.S. patent applications, Ser. No. 077,784, filed Sept. 21, 1979 and Ser. No. 141,268, filed Apr. 17, 1980.

Laundry machines as there disclosed are believed to have many significant advantages over present day laundry machines which employ various types of transmissions and mechanisms to convert rotary motion into oscillatory motion to selectively actuate the machine in its agitation or washing mode and in its spin extraction mode and which are believed to be more costly and/or complicated to manufacture and consume more energy and require more servicing. Laundry machines with electronically commutated motors require no mechanical means to effect oscillatory action of the agitator and the spin basket may be directly driven by such a motor. However, it is believed that the high torque which must be developed at low speeds during the agitation cycle and the high speed relatively low torque requirements for the spin cycle impose certain practical limitations on the design and manufacture of such machines. To accommodate these different requirements it is believed that a multiple drive path transmission with a greater ratio speed reduction for the wash cycle had to be provided or higher currents had to be supplied to the motor. Each of these alternatives is believed to have disadvantages, particularly the increased costs entailed. In the latter instance, it is believed that larger and more expensive semi-conductor devices would be required to handle higher current requirements.

SUMMARY OF THE INVENTION

Among the several objects of this invention may be noted the provision of an improved electronically commutated motor, an improved method of operating an electronically commutated motor, an improved control circuit, an improved drive for laundry machines, an improved laundry machine and an improved method of operating a laundry machine which overcome at least some of the disadvantageous features of the prior art as discussed above; the provision of such improved electronically commutated motor which will operate both in a high speed-low torque mode and in a low speed-high torque mode and has reduced energy consumption; the provision of such improved electronically commutated motor, method, circuit, laundry machine and drive in which less expensive semi-conductor devices with lower current ratings may be utilized to control such motor; the provision of such an improved electronically commutated motor which is compact in size, reliable and efficient in operation and may be economically fabricated; and the provision of such laundry machine and drive therefor which do not require any motion converting mechanisms, multiple speed or multiple path transmissions and provide a direct drive of the agitating and spinning components either with or without a speed reduction unit. These as well as other objects and advantageous features of the present invention will be in part apparent and in part pointed out hereinafter.

In general, an electronically commutated motor adapted to be energized from a DC power source in both a high speed mode and low speed mode through switching means at a current not significantly greater than a preselected level, in one form of the invention, comprises a stator having a multi-stage winding arrangement including a plurality of winding stages. Each winding stage has a plurality of winding turns, only a first portion of which is adapted to be electronically commutated in a first preselected sequence when the motor is energized in the high speed mode and a predeterminately greater portion of which is adapted to be electronically commutated in a second preselected sequence different from the first preselected sequence when the motor is energized in the low speed mode. The winding stages have means for being connected to the switching means. The switching means are adapted to change the number of winding turns which are to be electronically commutated. A permanent magnet rotor is associated with said stator and arranged in selective magnetic coupling relation with the winding stages so as to be rotatably driven thereby. The rotor is rotatably driven in one direction in the high speed mode so as to develop a first torque at the preselected current level when only the first portion of the winding turns of at least some of the winding stages is electronically commutated in the first preselected sequence. The rotor is also rotatably driven in the one direction and in another direction opposite thereto in the low speed mode so as to develop a second torque predeterminately greater than the first torque when said predeterminately greater portion of said winding turns of each winding stage is electronically commutated in the second preselected sequence at a current not significantly greater than the preselected level. The ratio of the greater portion of winding turns to the first portion of winding turns is substantially that of the ratio of the second torque to the first torque whereby the motor develops the first torque in the high speed mode and the second predeterminately greater torque in the low speed mode at currents substantially at the preselected level.

Further, in general a method of operating such an electronically commutated motor in one form of the invention comprises the steps of electronically commutating only the first portion of the winding turns of at least some of the winding stages to apply a DC voltage thereto in a first preselected sequence to rotatably drive the rotor in one direction and electronically commutating the predeterminately greater portion of the winding turns of the winding stages in a second preselected sequence to drive the rotor in the one direction and in another direction opposite thereto. The motor is energized in a high speed mode by connecting only a first portion of the winding turns of at least some of the winding stages to effect commutation to drive the rotor at a relatively high speed in the one direction and to develop a first torque at a preselected current level. The motor is energized in a low speed by connecting a predeterminately greater portion of the winding turns of each of the winding stages to effect commutation to drive the rotor in the one direction and in the another direction at a relatively low speed and to develop a torque predeterminately greater than the first torque at a current substantially at the preselected level. The ratio of the greater portion of the winding turns to the first portion of winding turns is substantially that of the ratio of the second torque to the first torque.

Also, in general a control circuit for such an electronically commutated motor in one form of the invention comprises means for developing control signals indicative of the rotational position of the rotor and means responsive to the control signals for electronically commutating at least some of the winding stages to apply a DC voltage thereto in a first preselected sequence to drive the rotor in one direction and in a second preselected sequence to drive the rotor in the one direction and another direction opposite thereto. Switching means are provided which in a high speed mode connect only the first portion of the winding turns of at least some of said winding stages to the commutating means to apply a DC voltage thereto in the first preselected sequence to drive the rotor at a relatively high speed in the one direction and to develop a first torque at a preselected current level and which in a low speed mode connect the predeterminately greater portion of said winding turns of each of the winding stages to the commutating means to apply a DC voltage thereto in the second preselected sequence to drive the rotor at a relatively low speed in the one direction and the another direction and to develop a second torque predeterminately greater than the first torque at a current substantially at the preselected level. The ratio of the greater portion of winding turns to the first portion of winding turns is substantilly that of the ratio of the second torque to the first torque.

Additionally in general, an electronically commutated motor adapted to be energized from a DC power source in a low speed mode and a high speed mode in one form of the invention comprises a stator with a plurality of winding receiving slots. A plurality of winding stages are carried in the slots for commutation in at least one preselected sequence with each of the winding stages having a plurality of winding turns for establishing a plurality of stator poles. A permanent magnet rotor is rotatable about a central axis of the stator in response to magnetic fields of the stator poles. Means are provided for developing control signals indicative of the rotational position of the rotor as well as means responsive to the control signals for electronically commutating at least some of the winding stages to apply a DC voltage thereto in at least one desired sequence to drive the rotor. Also provided are switching means which in a high speed mode connect only a portion of said winding turns of at least some of the winding stages to the commutating means to drive the rotor at a relatively high speed and to develop a first torque at a preselected current level and which in a low speed mode connect a predeterminately greater portion of the winding turns of each of the winding stages to the commutating means to drive the rotor at a relatively low speed and to develop a torque predeterminately greater than the first torque at a current not significantly greater than the preselected level. The ratio of the greater portion of winding turns to the first portion of winding turns is substantially that of the ratio of the second torque to the first torque whereby the motor develops the first torque in the high speed mode and the second predeterminately greater torque in the low speed mode at currents substantially at the preselected level.

Also, in general a drive for a laundry machine is provided in one form of the invention in which the machine has means operable in a low speed mode for agitating water and fabrics to be laundered thereby to wash the fabrics and operable in a high speed mode for thereafter spinning the fabrics to effect centrifugal displacement of water from the fabrics. This drive includes an electronically commutated motor as described above in the preceding paragraph for driving the agitating and spinning means with the means for electronically commutating the winding stages applying a DC voltage to the winding stages thereof in a unidirectional sequence during a spin mode and in an alternating sequence during a wash mode.

Further in general, a laundry machine in one form of the invention includes operable in a low speed mode for agitating water and fabrics to be laundered thereby to wash the fabrics and operable in a high speed mode for thereafter spinning the fabrics to effect centrifugal displacement of water from the fabrics, a laundry machine drive and an electronically commutated motor, all as described above in the preceding paragraph.

Also, in general a method of operating such a laundry machine in one form of the invention comprises the steps of developing control signals indicative of the rotational position of the rotor and electronically commutating in response to the control signals the winding stages in a unidirectional sequence during a spin mode and in an alternating sequence during a wash mode. The motor is energized in a spin mode by connecting only a first portion of the winding turns of at least some of the winding stages to effect commutation to drive the rotor unidirectionally at relatively high speed and to develop a first torque at a preselected current level. Energizing the motor in a wash mode is accomplished by connecting a predeterminately greater portion of the winding turns of each of the winding stages to effect commutation to oscillate the rotor at a relatively low speed and to develop a torque predeterminately greater than the first torque at a current substantially at the preselected level. The ratio of the greater portion of winding turns to the first portion of winding turns is substantially that of the ratio of the second torque to the first torque.

Additionally in general, an electronically commutated motor in one form of the invention comprises a generally rectangular stator core having first and second pairs of opposite sides with a plurality or corner sections of the stator core defined generally by adjacent opposite sides of the first and second opposite side pairs, respectively. A multi-stage winding arrangement associated with the stator core includes a plurality of winding stages adapted to be electronically commutated in at least one preselected sequence. Each of the winding stages comprises at least one coil having a plurality of winding turns formed into a plurality of loops defining pairs of opposite side loop portions disposed in the stator core. One of the opposite side loop portions of the coils in two of the winding stages is disposed in the corner sections of the stator core and the other of the opposite side loop portions of the coils in the two winding stages is disposed in the stator core adjacent the opposite sides of the first and second opposite side pairs, respectively. A permanent magnet rotor is rotatably associated with the stator core and adapted for selective magnetic coupling relation with the winding stages upon the electronic commutation thereof in the at least one preselected sequence.

BRIEF DESCRIPTION OF THE DRAWINGS

Corresponding reference characters refer to corresponding parts throughout the several views of the drawings.

The exemplifications set out herein illustrate preferred embodiments of the invention in one form thereof, and such exemplifications are not to be construed as limiting the scope of the invention in any manner.

DETAILED DESCRIPTION OF THE PREFERRED EMBODIMENTS

Figure 1:
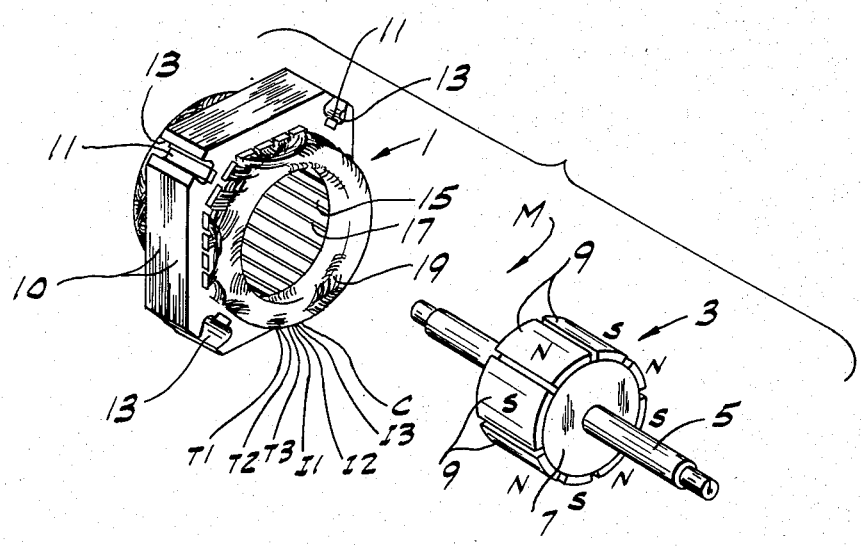
FIG. 1 is an exploded perspective view illustrating at least in part a stationary assembly and a rotatable assembly of an electronically commutated motor in one form of the invention.

Referring now to the drawings, and more particularly to FIG. 1, an electronically commutated motor, generally indicated at reference character M, is shown in one form of the invention as having a stationary assembly including a stator or core 1 and a rotatable assembly including a permanent magnet rotor 3 and a shaft 5. Rotor 3 is mounted on shaft 5 journaled for rotation in conventional bearings in end shields (not shown) of the stationary assembly with the rotor being rotatable within the bore of stator 1. The rotor comprises a ferromagnetic core 7 constituted by a number of thin flat circular ferromagnetic laminations secured together and to shaft 5. Eight essentially identical magnetic material elements or relatively thin arcuate segments 9 of permanent magnet material (e.g., ceramic type or cobalt samarium, Alnico, etc.), each providing a relatively constant flux field, are secured, for example, by adhesive bonding to rotor core 7. The segments each span somewhat less than 45 mechanical degrees and are magnetized to be polarized radially in relation to the rotor core with adjacent segments being alternately polarized as indicated. While magnets 9 on rotor 3 are illustrated for purposes of disclosure, it is contemplated that other rotors having different constructions and other magnets different in both number, construction, and flux fields may be utilized with such other rotors within the scope of the invention so as to meet at least some of the objects thereof.

Stator 1 also may be fabricated of thin ferromagnetic laminations 10, as is conventional in the AC motor art, which are held together by four retainer clips 11, one positioned in each corner notch 13 of the stator core. Alternatively, the stator core laminations may be held together by other suitable means, such as for instance welding or adhesively bonding, or merely held together by the windings, all as will be understood by those skilled in this art. Twenty-four inwardly directed teeth 15 define the stator bore and twenty-four axial slots 17 within which windings 19 are disposed for establishing eight stator poles. The winding end turns extend beyond the stator end faces and the winding terminal ends or leads are brought out and connected separately to a control circuit and associated switching means. While stator 1 is illustrated for purposes of disclosure, it is contemplated that other stators of various other constructions and with different numbers of teeth and slots may be utilized within the scope of the invention so as to meet at least some of the objects thereof.

Figure 2:
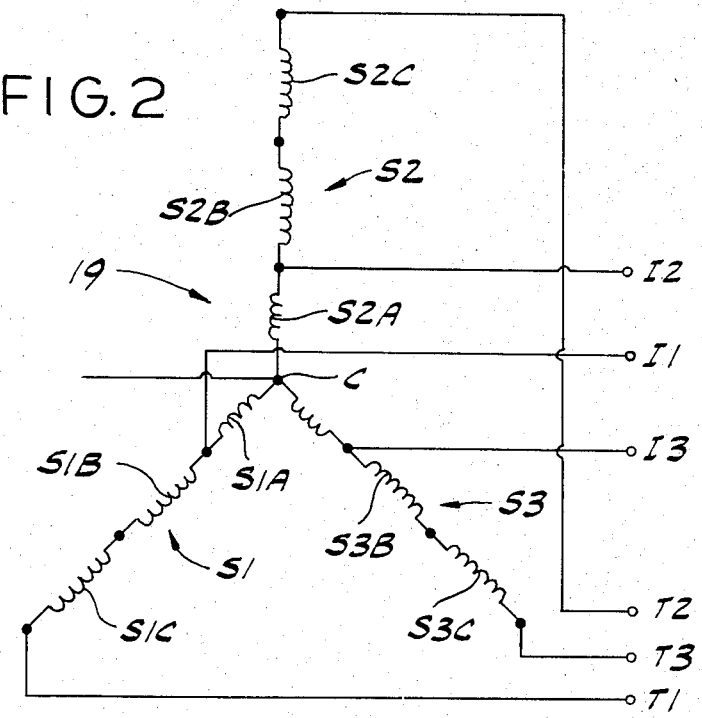
FIG. 2 is a schematic diagram showing multi-stage winding arrangement of the electronically commutated motor of FIG. 1.

Motor M as described herein merely for purposes of disclosure is a three-stage, eight-pole motor, but it will be understood that the ECM of this invention may be of 2, 4, 6, etc. pole construction and have 2, 3, 4 or more winding stages within the scope of the invention so as to meet at least some of the objects thereof. FIG. 2 shows schematically a multi-stage winding arrangement or stator winding 19 having three winding stages S1, S2, and S3 each made up of three sets of coils S1A–S1C, S2A–S2C, and S3A–S3C each of which is constituted by a preselected number of winding turns of an electrical conductor. Each winding stage has an end terminal T1, T2, and T3, respectively, and an intermediate tap I1, I2, and I3, respectively. Thus, it may be noted that coil sets S1A, S2A and S3A define tapped sections of the winding stages, respectively. The other end terminals of each of the winding stages are commonly connected at C. While winding stages S1, S2 and S3 are illustrated herein as having three coil sets, end terminals and intermediate taps for purposes of disclosure, it is contemplated that any number of winding stages greater than one thereof may be utilized having any number of coil sets, end terminals and intermediate taps greater than one thereof within the scope of the invention so as to meet at least some of the objects thereof.

Figure 3:
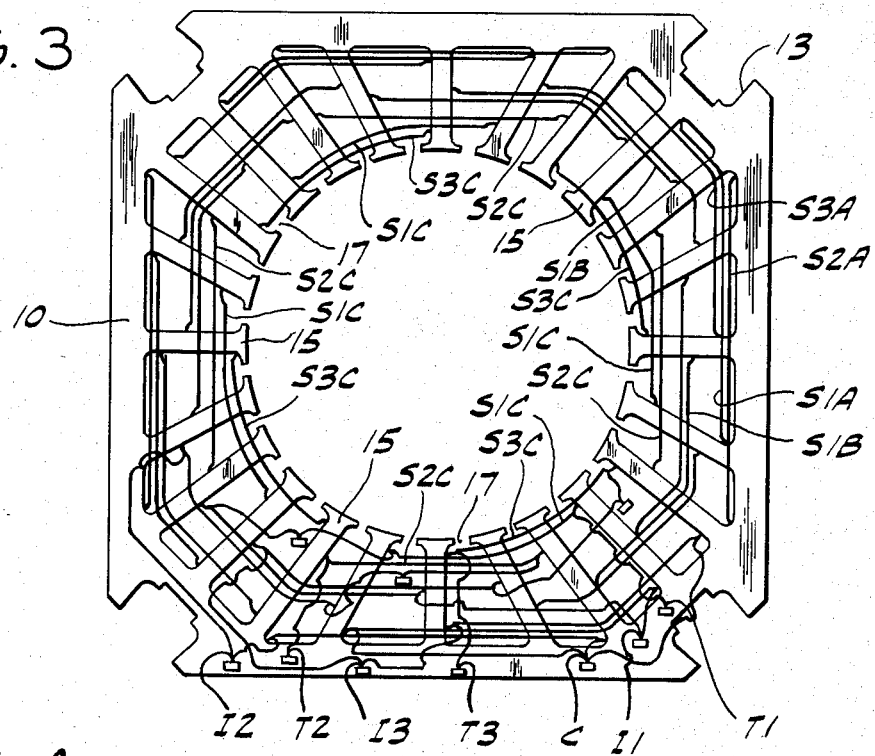
FIGS. 3 and 4 respectively illustrate multi-stage winding arrangements disposed in the stationary assembly of the electronically commutated motor of FIG. 1.

In one multi-stage winding arrangement, as illustrated in FIG. 3, the winding turns are skein-wound with each winding stage being made up of three sets of coils of electrical conductors, e.g., S1A, S1B, and S1C. Each coil set is made by coiling in a circle the desired number of turns and then bending the generally planar circular coil into a generally cruciform shape by applying inward pressure in the plane at 90° intervals to form four generally U-shaped lobes or loops extending radially outwardly generally in the plane. Each lobe is then bent at right angles out of the plane of the coil to extend in a generally axial direction and to assume a generally cylindrical form (i.e., the coil is of generally sinusoidal form girthwise on the surface of a cylinder) with eight generally U-shaped loops for axial insertion of the side turns thereof into the stator slots.

For convenience in handling, insertion into the stator slots and providing the intermediate taps I1, I2, and I3, three sets of coils have been utilized for each winding stage. Each loop of each coil set S2A, S1A, and S3A is sequentially inserted into stator slots so that each loop of each set spans three stator teeth 15 with the coil set S2A spanning three teeth displaced one slot from those occupied by the turns of coil set S1A and those in coil set S3A also spanning three teeth but displaced one slot from the slots occupied by the turns in S2A. The same sequence is followed in inserting the winding sets S1B, S2B, and S3B and S1C, S2C, and S3C. The side turns or side loop portions of each of the coil sets of the S1 stage are all placed in the same slots and, similarly, the side turns or side loop portions of each coil set of winding stages S2 are placed in the same slots but with the one-slot angular displacement between the coil sets of each of the three winding stages, etc. The end turns of each of the U-shaped loops of each set of coils in a winding stage are alternately positioned when inserted so that the loop end turns of S1A and S1C, e.g., will extend from one face of the stator and the loop end turns of S1B, e.g., will extend from the opposite face of the stator. This is illustrated in FIG. 3, wherein the several turns of each coil set are represented by a single line. Four end turn portions of coil set S1C which extend from the face of the stator as viewed in FIG. 3 are so indicated with the other four end turns of S1C extending away from the under face of the stator and therefore being hidden in this view. The side turns of coil sets S1A and S1B are carried in the same spaced-apart slots 17 as those of S1C so as to span the same three stator teeth in each instance. A lead is connected to the junction between coil sets S1A and S1B and constitutes an intermediate tap I1. Similarly, intermediate taps I2 and I3 are provided for winding stages S2 and S3.

Thus, the eight generally U-shaped loops of each of the winding stage sets, each occupying one of eight slots with each loop encompassing three teeth, will occupy the twenty-four stator slots provided. Accordingly, it can be seen that when the winding stages are energized in a temporal sequence three sets of eight magnetic poles are established that will provide a radial magnetic field which moves clockwise or counterclockwise around the stator bore depending on the preselected sequence or order in which the stages are energized. This moving field intersects with the flux field of the permanent magnet rotor poles 9 to cause the rotor 3 to rotate relative to the stator 1 in the desired direction to develop a torque which is a direct function of the intensities or strengths of the magnetic fields.

Figure 4:
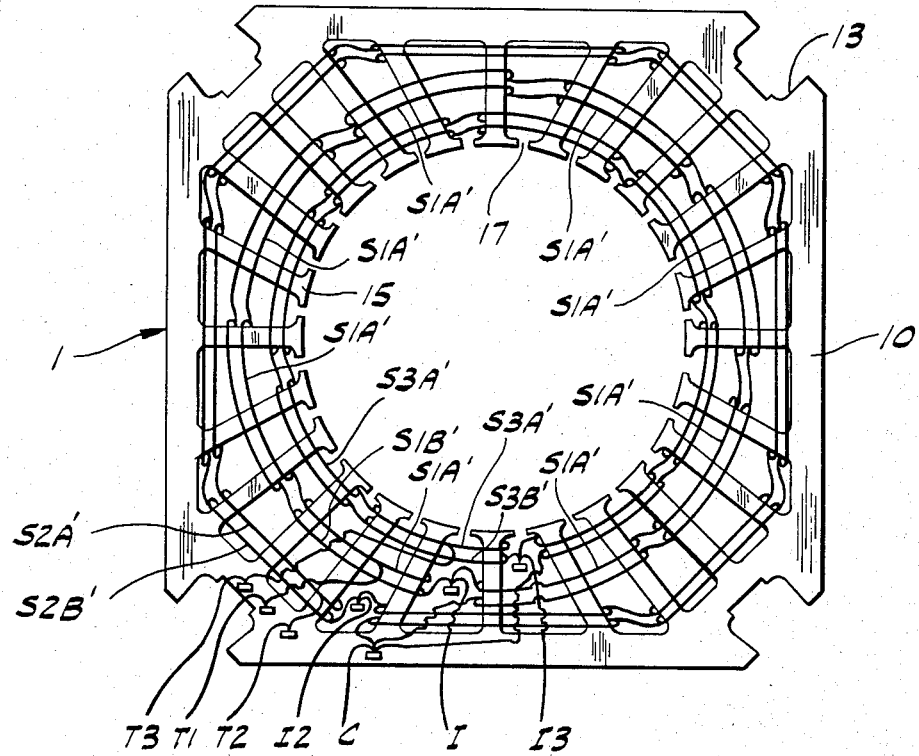

Another multi-stage winding arrangement having three winding stages with similar intermediate taps and which will function in essentially the same way as that described above is illustrated in FIG. 4. The winding coils of each stage of the FIG. 4 multi-stage winding arrangement are concentrically wound rather than being skein-wound as in FIG. 3, i.e., each coil is made up of a plurality of complete loops of winding turns rather than U-shaped loops. As they are connected to like terminal and tap leads, the same reference characters for the terminal and tap leads are employed as in FIG. 3. However, only two coil sets of winding turns are used per winding stage, each set containing eight concentrically wound, serially connected coils. The side turns of each of the two coils sets for each winding stage are inserted in slots separated by three stator teeth to form eight stator poles when energized, as in FIG. 3, with an angular displacement of one slot between respective coils of adjacent stages. This is indicated in FIG. 4 where S1A' comprises eight coils and its side turns are positioned in the same slots 17 as are coils of set S1B'. The coils of the sets of the second and third coil sets are respectively similarly indicated as S2A', S2B' and S3A' and S3B'.

It will be understood that although only one intermediate tap has been described above, one or more additional taps may be provided for operation of motor M in three or more speed modes.

These stator windings 19 may be wound by means of conventional induction motor winding machinery. Thus the winding turns may be wound directly on coil-injection tooling for disposition in the core slots, or the winding may be wound on a coil receiver, transferred to coil-injection tooling and subsequently be axially inserted into the stator slots, for example, with equipment of the type shown and described in U.S. Pat. Nos. 3,522,650, 3,324,536, 3,797,105 or 3,732,897, the disclosures of which are incorporated herein by reference. While the multi-stage winding arrangements of FIGS. 3 and 4 are illustrated herein for purposes of disclosure, it is contemplated that other types of multi-stage winding arrangements may be utilized within the scope of the invention so as to meet at least some of the objects thereof.

The winding stages of motor M are commutated without brushes by sensing the rotational position of the rotatable assembly or rotor 3 as it rotates within the bore of stator 1 and utilizing electrical signals generated as a function of the rotational position of the rotor sequentially to apply a DC voltage to each of the winding stages in different preselected orders or sequences that determine the direction of the rotation of the rotor. The sensors may be stationary photosensitive devices which cooperate with a light-interrupting shutter mounted on the rotor or shaft, or position sensing may be accomplished in other ways by other means for developing control signals indicative of the rotational position of the rotor, such as by a position-detecting circuit responsive to the back EMF of the ECM to provide a simulated signal indicative of the rotational position of the motor to control the timed sequential application of voltage to the winding stages of the motor.

Figure 5:
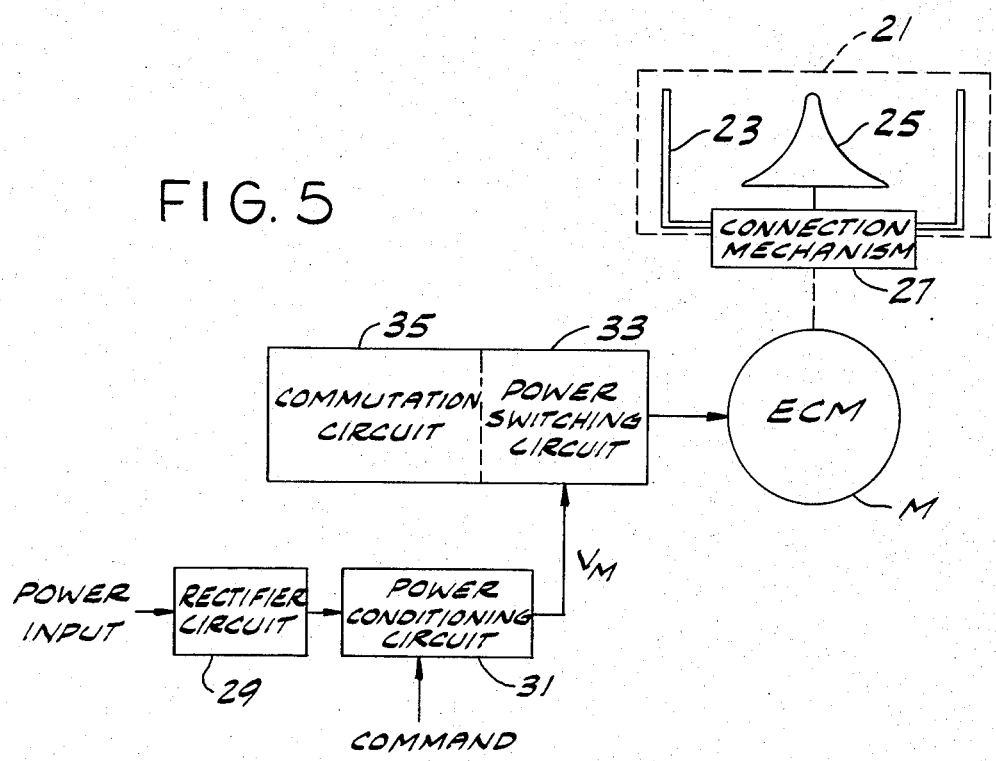
FIG. 5 is a schematic illustration of a laundry machine and drive therefor respectively in one form of the invention incorporating the electronically commutated motor of FIG. 1.

FIG. 5 illustrates schematically a laundry machine 8 in one form of the invention which includes motor M and the drive therefor also in one form of the invention. Machine 21 comprises a basket 23 which is rotatable within a tub (not shown) which holds the water for washing the fabrics to be laundered, and a coaxially mounted agitator 25, both of which are rotatable independently or jointly about their common axis. Agitator 25 and basket 23 together comprise means for agitating water and fabrics to be laundered thereby to wash them and for thereafter spinning the fabrics to effect centrifugal displacement of water therefrom. Motor M is coupled selectively to the agitator alone during the wash cycle or mode and to both the basket and the agitator in the spin cycle through a connection mechanism 27 which may include a fixed ratio speed reducer, such as a gear box or a pulley arrangement or the like for instance, or the shaft 5 of motor M may be directly coupled to the agitator and the basket. Mechanism 27 therefore comprises means for driving the agitating and spinning means. Power supplied from a 115 V 60 Hz AC line is rectified by a rectifier circuit 29 which defines a DC power source and applied to a power conditioning circuit 31, which, in accordance with control signals which are a function of selected conditions and parameters (as represented in part by an applied command signal), control the rectified AC from 29 with respect to amplitude, duration and timing. The output of power conditioning circuit 31 provides an effective DC voltage $V_M$ to be applied to power switching circuit 33. The operation of circuit 33 is controlled from a commutation circuit 35 so that the effective voltage is applied to the winding stages of ECM M in the aforementioned different preselected sequences. The motion or rotation of agitator 25 and basket 23 in either clockwise and counterclockwise directions is thus controlled by the applied command signals as well as by the action of commutation circuit 35.

Figures 6A, 6B:
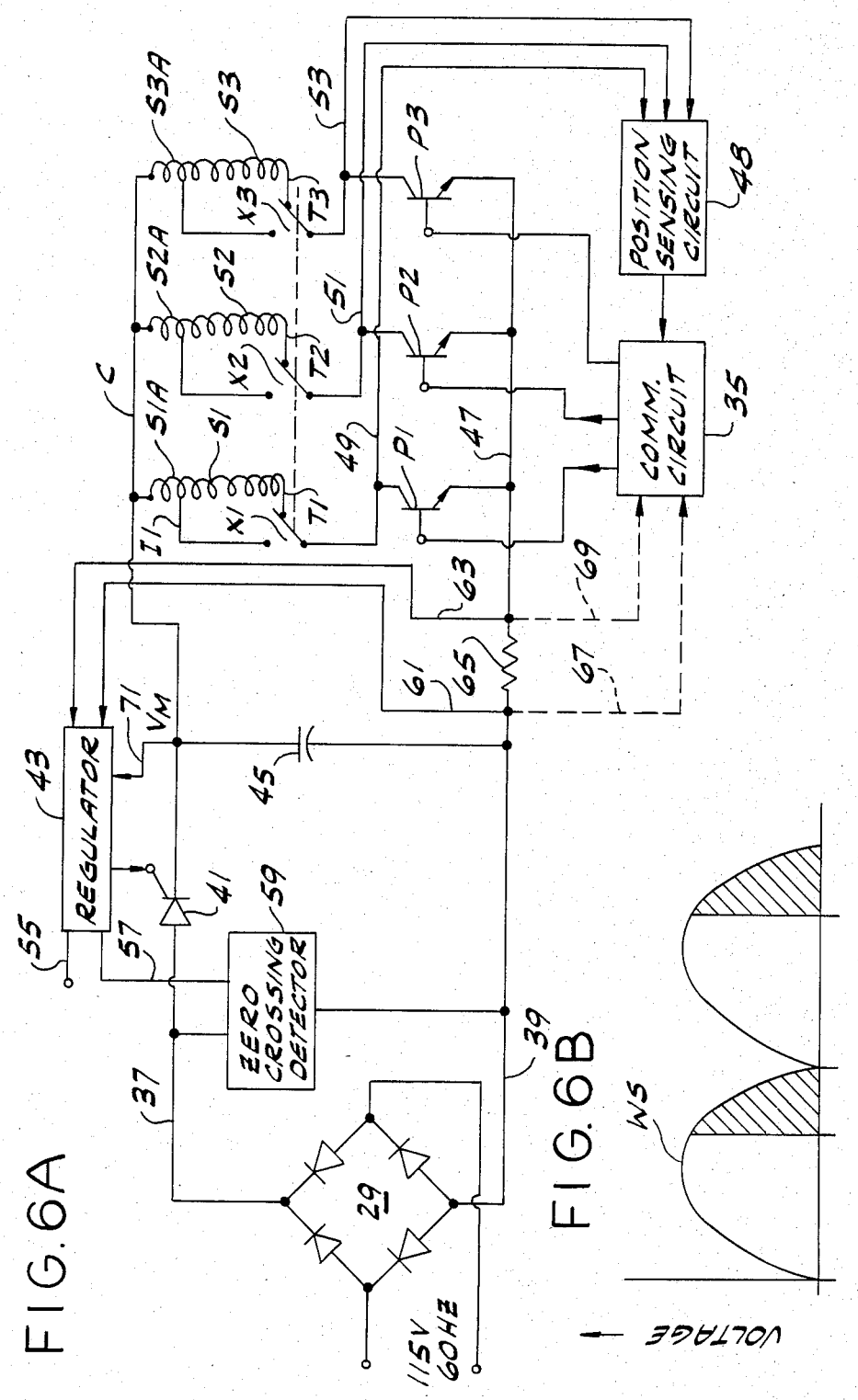
FIG. 6A is a schematic diagram of a control circuit in one form of the invention for the electronically commutated motor of FIG. 1 illustrating principles which may be practiced in a method of operating the motor in one form of the invention.
FIG. 6B illustrates an aspect of the operation of control circuit of FIG. 6A.

FIG. 6A shows the basic components of a control circuit system in one form of the invention for operating motor M and the laundry machine of FIG. 5 in accordance with the principles of the present invention. Full-wave bridge rectifier 29 having its input nodes supplied with AC power provides full-wave rectified AC (as represented by wave shape WS in FIG. 6B) to lines 37 and 39. Silicon controlled rectifier (SCR) 41 is serially connected between line 37 and a line C which comprises the common connection between one end of each of the three winding stages S1, S2 and S3. In response to a regulator 43, which gates or triggers SCR 41, SCR 41 acts as a switch to control the power supplied to line C as a function of the portion of time and SCR 41 is made conductive. The controlled rectified AC carried by lines C and 39 is smoothed and filtered by a capacitor 45 thereby providing a controlled (switched, pulsed, or interrupted) filtered DC voltage to the winding stages.

The other ends or terminals T1, T2, and T3 of winding stages S1, S2, and S3 are respectively connected to one contact of each of three ganged double-throw switch devices X1, X2, and X3, which may comprise contacts of an electromagnetic relay or the like for instance. The other contacts of the switch device are connected to the respective intermediate winding stage taps I1, I2, and I3. The switch arms of X1, X2, and X3 are respectively connected to the collectors of commutation power transistors P1, P2, and P3. As these contacts are made and broken only when changing from a low-speed mode to a high-speed mode or vice versa, and typically this switching is "dry" (i.e., done with no power being carried by the switch contacts), the expected life of customary relays is believed ample. The emitters of these transistors P1, P2 and P3 are commonly connected to a line 47. The bases of these transistors are connected to receive signals from commutation circuit 35 in accordance with applied position signals provided by a position sensor 48. These transistors collectively form the power switching circuit 33 of FIG. 5 and comprise means responsive to the control signals indicative of rotational position of the rotor for electronically commutating the winding stages. As explained, such position sensing circuits are described in U.S. Pat. No. 4,169,990 and application Ser. No. 141,268, filed Apr. 17, 1980, referred to above and incorporated by reference herein. Although as there described, optical, magnetic or other physical effects may be employed to provide position sensing signals of this controlled circuit, within the scope of the invention so as to meet at least some of the objects thereof, this position sensing circuit 48 is preferably responsive to back EMF signals derived from the collectors of transistors P1–P3 supplied by lines 49, 51 and 53. These signals, which are proportional to rotor angular velocity, are subsequently integrated to provide the desired position signals to commutation circuit 35.

SCR 41, which is normally cut off or nonconductive, is controlled by regulator 43 which is responsive to a number of different input signals. SCR 41, regulator 43, and capacitor 45 all form part of the power conditioning circuit 31 of FIG. 5.

A first input signal to regulator 43 (represented as "COMMAND" in FIG. 5), applied at terminal 55, is provided from an external source and represents the desired motor performance and function. In the laundry machine of this invention this signal is typically provided by a microcomputer, a sequence timer, etc. in accordance with the instructions dialed or otherwise entered or set into the control panel of the laundry machine. Other signals representative of motor performance and function may also be provided and generated in different ways. A second regulator input signal provided at line 57, is derived from a zero crossing detector 59 which is connected across the output leads 37 and 39 of bridge rectifier 29. Regulator 43 has another input signal supplied by a pair of lines 61 and 63 connected across a resistor 65 series connected in the DC power return lead from the winding stages. This resistor carries the total current drawn by the winding stages. Thus the voltage drop across resistor 65, which is the signal provided at leads 61 and 63, is proportional to the total current drawn by the winding stages. This voltage signal may optionally also be provided to commutation circuit 35 as shown by broken lines 67 and 69. The voltage applied to the winding stages, represented at $V_M$, and supplied to regulator 43 by a line 71, is a further regulator input signal and is the effective voltage applied to the winding stages, as present between positive polarity lead 71 and negative polarity line 61. This signal is utilized for speed regulation purposes.

In operation, position sensing circuit 48 controls commutation circuit 35 which in turn controls the timing of the electronic commutation or energization of the winding stages S1–S3 in response to the applied rotor position signals, as well as controlling the sequence of the energization of these winding stages. This control function is provided by the signals applied to the bases of commutation transistors P1, P2, and P3 which render these transistors conductive at the desired points in time. Utilizing the signal across lines 61 and 63, which is a voltage proportional to the total motor current, regulator 43 functions as a current limiter so that if the motor current tends to rise above a preselected or regulated current level, regulator 43 controls SCR 41 to limit the current supplied to the winding stages. If the voltage developed across current sensing resistor 65 is also applied via optional leads 67 and 69 to commutation circuit 35, the conductive periods of commutation transistors P1–P3 will be held at a maximum consistent with the preselected current level.

The angular velocity of the rotatable assembly 3 is regulated in accordance with phase angle control techniques. Zero cross-overs of the 60 Hz line voltage are detected and a signal is generated at a predetermined time interval thereafter, e.g., at a phase angle of 120°. That signal is applied via lead 57 to regulator 43 which responds by turning on SCR 41. Thus the signal applied at terminal 55, which represents the desired motor performance and function, determines that power is to be supplied to the winding stages during a time interval corresponding to a 60° phase angle, as shown in the shaded area in FIG. 6B. As noted above, capacitor 45 filters the output of SCR 41 to produce an effective voltage $V_M$ which is applied to winding stages S1, S2, and S3. It will be seen therefore that a DC voltage is applied only during a 60° interval under the assumed operating conditions. Thus, where phase control techniques are employed the angular velocity of the rotor 3 is controlled by preselecting the phase angle during which a DC voltage is applied to the winding stages.

Further as shown in FIG. 6A, the control of the angular velocity of the rotatable motor assembly may be further defined by means of voltage feedback whereby $V_M$ is applied to regulator 43 for comparison against the external command signal provided at terminal 55. Since $V_M$ is representative of the actual angular velocity of the rotatable motor assembly, this velocity signal will vary with the difference between the compared signals. The resultant error signal is applied to the gate of SCR 41. If the amplitude of the error signal increases, the SCR remains conductive for a longer time interval to increase the effective voltage and cause the motor to speed up. If it decreases, SCR 41 is made conductive for a shorter time interval and the drag on the motor M, e.g., due to friction and the wash load in the laundry machine, reduces motor speed until the desired angular velocity is reached.

The speed of electronically commutated motor M is therefore seen to be a direct function of the applied voltage. Thus to operate at high speeds, a high effective voltage must be supplied to the stator windings S1–S3. Conversely, to operate at low speeds it is necessary to supply low voltage $V_M$ to these stator windings. To achieve high output power at low voltages requires high currents. The cost of semi-conductor devices P1–P3 utilized in the commutation of motor M, however, increases with increased current ratings.

Thus in laundry machine 21 where the basket is spun at relative high speeds, such as 600 rpm or so, the ECM will operate at relatively high voltages and can supply ample torque at relatively low current. However, in a wash mode machine 21 must agitate the fabrics to be laundered at a much lower speed, e.g., 150 rpm rotational speed, and typically in an oscillatory mode. The load in the oscillatory or wash mode, which includes both the wash water and the fabrics, is much greater than simply the wet fabric load that is to be spun in the spin cycle to extract water therefrom. Therefore a much higher torque must be developed by motor M to operate laundry machine 21 to take care of the increased load during washing. The terms oscillatory mode or oscillatory motion as used herein means rotation for a predetermined time period or number of revolutions or a portion of a revolution in one direction, e.g., clockwise, followed by rotation for another predetermined time period or number of revolutions or portion of a revolution in another direction, e.g., counterclockwise, opposite such one direction.

Figure 7:
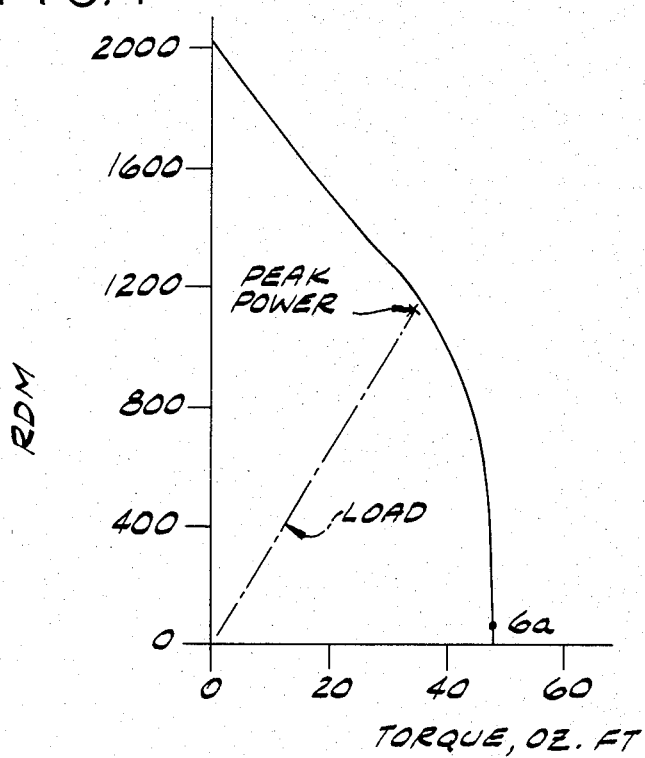
FIG. 7 is a graphical representation of speed-torque characteristics and performance of a motor constructed in accordance with FIG. 1 when operating in a low speed-high torque mode to effect agitation of fabrics to be laundered.
Figure 8:
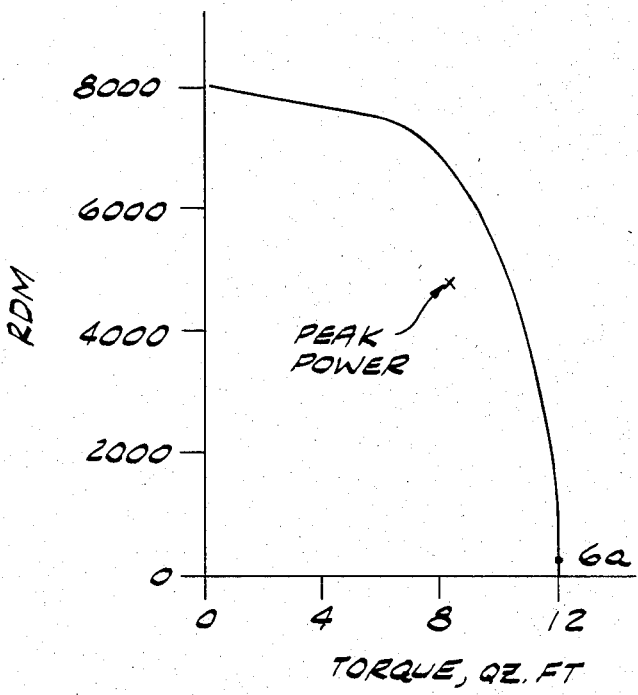
FIG. 8 is another graphical representation of speed-torque characteristics and performance of the same motor identified in connection with FIG. 7 when operating in a high speed-low torque mode to effect centrifugal displacement of water from the laundered fabrics.

The higher torque requirements of laundry machine 21 when operated in a wash mode are illustrated in FIG. 7 where connection mechanism 27 includes an 8:1 fixed ratio speed reducer; however, it is contemplated that other fixed ratios for the speed reducer may be employed within the scope of the invention so as to meet at least some of the objects thereof. As there shown, motor M develops approximately 35 oz. ft. of torque at about 1200 rpm. shaft speed to actuate the agitator with an oscillating motion at a rotational speed of about 150 rpm. for laundering a full load of fabrics. This is indicated by the load line and the peak power point in FIG. 7. In contrast, when machine 21 is operating in its spin mode, as illustrated in FIG. 8, the peak power that is developed to spin dry a laundered full load of fabrics provides a torque only slighly over 8 oz. ft. at a shaft speed of rotor 3 of about 5000 rpm., which at the fixed ratio speed reduction of 8:1 causes the basket to spin at about 600 rpm.

As discussed above, to operate motor M at the lower speed of 1200 rpm. necessitates decreasing the effective voltage being applied to the winding stages and will proportionately decrease the current and thus the power delivered to the winding stages which in turn decreases the torque developed. Thus for winding stages of a given or fixed number of turns, operating the motor at a lower speed will reduce the power supplied to the motor. To increase the current to provide a much higher torque required in the wash cycle or mode would require greatly increasing the current through the winding stages and thus using commutation transistors with much higher current ratings, or using a dual path and ratio transmission with a much higher gear ratio being used for driving the agitator in the wash cycle.

In accordance with one aspect of the present invention the much greater torque requirements in the low speed wash load are attained without utilizing either of these undesirable alternatives. This is accomplished by providing each of the winding stages with the taps I1, I2, and I3 and switching means X1, X2, and X3 which connect only a portion of the winding turns in each winding stage S1, S2, and S3 to the commutation transistors during operation in the spin mode, and connecting the full number of turns in each winding stage to transistors P1, P2, and P3 in the wash mode (with the switch arms in the positions shown in FIG. 6A). Then, depending on the ratio of the greater number of turns connected in the wash mode to the lesser number connected in the spin mode, the same level of current supplied to the winding stages will enable the motor M to deliver that much more torque. For example, by skein winding coil sets S1A, S2A, and S3A of the stator assembly of FIG. 3 with 24 turns each and skein winding coil sets S1B, S2B, S3B, S1C, S2C, and S3C with 36 turns each a ratio of turns connected by switches X1-X3 in the low speed-high torque wash mode to the number of turns so connected in the high speed-low torque spin mode will be 4:1. Thus, for each unit of current carried by the total turns in the winding stages four times as much torque will be developed as will be developed by the motor with only the portion of the winding turns connected when the switch arms of switches X1-X3 are moved to connect only coil sets S1A, S2A, and S3A. In the concentrically wound stator assembly as shown in FIG. 4 coil sets S1A'-S3A' each are wound with 12 full turns and the other coil sets S1B'-S3B' each have 36 full winding turns, thereby having the same 4:1 turns ratio between the total turns and the number of turns in the S1A', S2A', and S3A' coil sets. While the turn ratios effective during the high and low speed mode operation of motor M are presented for purposes of disclosure, it is contemplated that other turn ratios may be employed to obtain other resulting torques within the scope of the invention so as to meet at least some of the objects thereof.

The current required in the spin mode through whatever number of winding turns are energized to develop the peak power required in this high speed-low torque mode establishes a preselected current level. An additional number of turns are then provided to develop the predeterminately or substantially increased torque needed for the wash mode at approximately the same level of current. Thus, a predeterminately or substantially greater number of ampere turns are provided in the wash mode even though the current remains the same as, or is not significantly greater than, that required in the spin mode to produce the torque needed to provide the peak power required for the spin mode.

The foregoing is aptly illustrated in FIGS. 7 and 8 which graphically depict the speed-torque relation and characteristics of motor M in the high speed-low torque spin mode (FIG. 8) and the low speed-high torque wash mode. These curves illustrate that where the effective or average DC current drawn by the winding stages at the applied effective voltage is drive motor 3 at the desired respective speed levels is limited to about 6 amperes, the increased torque at low speeds is developed to meet the peak power requirements in the wash mode without requiring more current than is required to supply the peak power at the higher speeds in the spin mode. This preselected current level represents about 4 amperes AC to be supplied by the 115 VAC power source to the rectifier 29. It is believed that this compares to 8-10 amperes required at 115 VAC to power the conventional laundry machine with an AC induction motor, dual path and ratio transmission and mechanism to convert rotary motion to oscillatory motion to drive the agitator.

It is to be understood that the switching functions of X1-X3 may also be accomplished by solid-state switching devices, such as triacs, and that additional winding taps may be provided to connect different fractional proportions of the winding turns so that efficient low current operation of the ECM may be effected at several different speeds. Further, it will be noted that although in the specific embodiments described herein the intensities or strengths of the magnetic poles developed during operation in the high speed mode are all equal, the number of winding turns so energized may be effectively reduced by developing poles of different strengths or intensities, or the number of coil sets energized in the high speed mode may be reduced thereby to establish less than eight stator poles. Further, it is to be understood that while the laundry machine and drive embodiments here specifically described utilize a separate agitator and basket mounted for rotation on a common vertical axis, the invention herein disclosed is also effective in other styles of laundry machines, e.g., where the basket is mounted on a horizontal or inclined axis and there is no separate finned agitator but the basket is operated in an oscillatory mode to agitate the wash water and fabrics to launder them.

From the foregoing, it is now apparent that a novel electronically commutated motor M, a novel method of operating such, a novel control circuit, and novel laundry machine 21 and novel drive therefor have been disclosed for accomplishing the objects set forth hereinbefore, as well as others, and the changes as to the precise arrangements, shapes, details and connections of the component parts, as well as the steps of the methods, may be made by those having ordinary skill in the art without departing from the spirit of the invention or the scope thereof as set out in the claims which follow.

What I claim as new and desire to secure by Letters Patent of the United States is:

1. An electronically commutated motor adapted to be energized from a DC power source in both a high speed mode and a low speed mode through switching means at a current not significantly greater than a preselected level, the motor comprising:

a stator having a multi-stage winding arrangement including a plurality of winding stages, said winding stages each having a plurality of winding turns only a first portion of which is adapted to be electronically commutated in a first preselected sequence when the motor is energized in the high speed mode and a predeterminately greater portion of which is adapted to be electronically commutated in a second preselected sequence different from the first preselected sequence when the motor is energized in the low speed mode, and means for connecting said winding stages to the switching means, the switching means being adapted to change the number of winding turns which are to be electronically commutated; and a permanent magnet rotor associated with said stator and arranged in selective magnetic coupling relation with said winding stages so as to be rotatably driven thereby, said rotor being rotatably driven in one direction in the high speed mode so as to develop a first torque at the preselected current level when only said first portion of said winding turns of at least some of said winding stages is electronically commutated in the first preselected sequence and said rotor also being rotatably driven in the one direction and another direction opposite thereto in the low speed mode so as to develop a second torque predeterminately greater than the first torque when said predeterminately greater portion of said winding turns of each winding stage is electronically commutated in the second preselected sequence at a current not significantly greater than the preselected level, the ratio of the greater portion of winding turns to the first portion of winding turns being substantially that of the ratio of the second torque to the first torque whereby the motor develops the first torque in the high speed mode and the second predeterminately greater torque in the low speed mode at currents substantially at the preselected level.

2. A motor as set forth in claim 1 wherein the winding turns of each winding stage have a terminal at each end thereof and at least one intermediate tap, the winding turns between one end terminal and the tap comprising the first portion of said winding turns of each stage, and the winding turns between the end terminals of each winding stage comprising said predeterminately greater portion thereof.

3. A motor as set forth in claim 1 wherein the respective portions of the winding stages electronically commutated in both the low speed and high speed modes will develop the respective desired maximum torques in each mode at the preselected level of current.

4. A motor as set forth in claim 3 in which the stator is skein-wound wherein each winding turn is a generally U-shaped loop of conductor and wherein each of the winding stages comprises a plurality of winding sets.

5. A motor as set forth in claim 3 wherein each of the winding stages comprises a plurality of winding sets and in which the stator is concentrically wound wherein each winding turn is a complete loop of conductor.

6. An electronically commutated motor adapted to be energized from a DC power source in a low speed mode and a high speed mode comprising:
   a stator having a plurality of winding receiving slots;
   a plurality of winding stages carried in said slots and adapted to be commutated in at least one preselected sequence, each of said winding stages having a plurality of winding turns for establishing a plurality of stator poles;
   a permanent magnet rotor adapted to rotate about a central axis of said stator in response to magnetic fields of said stator poles;
   means for developing control signals indicative of the rotational position of said rotor;
   means responsive to the control signals for electronically commutating at least some of said winding stages to apply a DC voltage thereto in at least one desired sequence to drive said rotor; and
   switching means adapted in the high speed mode to connect only a first portion of said winding turns of at least some of said winding stages to said commutating means to drive said rotor at a relatively high speed and to develop a first torque at a preselected current level and adapted in the low speed mode to connect a predeterminately greater portion of said winding turns of each of said winding stages to said commutating means to drive said rotor at a relatively low speed and to develop a torque predeterminately greater than the first torque at a current not significantly greater than the preselected level, the ratio of the greater portion of winding turns to the first portion of winding turns being substantially that of the ratio of the second torque to the first torque whereby the motor develops the first torque in the high speed mode and the second predeterminately greater torque in the low speed mode at currents substantially at the preselected level.

7. A motor as set forth in claim 6 which further includes means for limiting the current supplied to the winding stages to said preselected level whereby the current drawn by said winding stages when the motor is operating in either its low speed or its high speed modes will not exceed the preselected level.

8. A motor as set forth in claim 7 wherein the winding turns of each winding stage have a terminal at each end thereof and at least one intermediate tap, the winding turns between one end terminal and the tap comprising the first portion of said winding turns, and the switching means is adapted in its low speed mode to connect the end terminals of the winding turns of each winding stage to said commutating means and is adapted in its high speed mode to disconnect the commutating means for one end terminal and to connect the commutating means to said intermediate tape whereby the commutating means is connected only to the first portion of the winding turns of each stage.

9. A motor as set forth in claim 6 wherein the stator has a bore therein, the winding receiving slots intersect the bore, and the rotor is adapted to rotate therein.

10. A motor as set forth in claim 9 wherein the respective portions of the winding stages connected by the switching means to the commutating means in both the low speed and high speed modes will develop the respective desired maximum torques in each mode at the preselected level of current.

11. A motor as set forth in claim 10 wherein the total number of stator poles established by each winding stage when operating with the switching means in its high speed mode corresponds to the number of stator poles established when operating with the switching means in its low speed mode.

12. A motor as set forth in claim 11 wherein the intensities of the magnetic fields of each of the stator poles when operating with the switching means in its high speed mode are generally equal.

13. A motor as set forth in claim 9 in which the stator is skein-wound therein each winding turn is a generally U-shaped loop of conductor and wherein each of the winding stages comprises a plurality of winding sets.

14. A motor as set forth in claim 9 wherein each of the winding stages comprises a plurality of winding sets and in which the stator is concentrically wound wherein each winding turn is a complete loop of conductor.

15. A motor as set forth in claim 6 in which said switching means is a relay.

16. A motor as set forth in claim 15 in which the relay is an electromechanical relay.

17. A method of operating an electronically commutated motor adapted to be energized from a DC power source, the motor including a stator having a multi-stage winding arrangement with a plurality of winding stages each having a first portion of winding turns and a predeterminately greater portion of winding turns, and a permanent magnet rotor associated with the stator and arranged in selective magnetic coupling relation with the winding stages so as to be driven thereby in a high speed mode and in a low speed mode, the method comprising the steps of:
   electronically commutating only the first portion or the winding turns of at least some of the winding stages to apply a DC voltage thereto in a first preselected sequence to rotatably drive the rotor in one direction and electronically commutating the predeterminately greater portion of the winding turns of the winding stages in a second predetermined sequence to drive the rotor in the one direction and in another direction opposite thereto;

energizing the motor in the high speed mode by connecting only the first portion of said winding turns of the at least some winding stages to effect commutation to drive the rotor at a relatively high speed in the one direction and to develop a first torque at a preselected current level; and energizing the motor in the low speed mode by connecting the predeterminately greater portion of the winding turns of each of the winding stages to effect commutation to drive the rotor in the one direction and in the another direction at a relatively low speed and to develop a second torque predeterminately greater than the first torque at a current substantially at the preselected level, the ratio of the greater portion of winding turns to the first portion of winding turns being substantially that of the ratio of the second torque to the first torque.

18. A method as set forth in claim 17 which further includes the step of limiting to said preselected level the current supplied to the winding stages whereby the current drawn by said winding stages when the motor is operating in either its low speed or its high speed mode will not exceed the preselected level.

19. A method of operating an electronically commutated motor adapted to be energized from a DC power source in both a high speed mode and a low speed mode at a current not significantly greater than a preselected level, the electronically commutated motor including a stator with a multi-stage winding arrangement having a plurality of winding stages with each winding stage having a plurality of winding turns, and a permanent magnet rotor associated with the stator and adapted to be rotatably driven in selective magnetic coupling relation with at least some of the winding stages, the method comprising the steps of:

electronically commutating only a portion of the winding turns of the at least some winding stages in a preselected sequence and effecting thereby unidirectional rotation in the high speed mode of the permanent magnet rotor in response to its selective magnetic coupling relation with the electronically commutated winding turn portions;

drawing a current through only the electronically commutated winding turn portions to develop a first torque during unidirectional rotation of the permanent magnet rotor in the high speed mode which first torque is directly proportional to the preselected level of current drawn by the electronically commutated winding turn portions;

electronically commutating a greater portion of the winding turns of the winding stages in another preselected sequence different from the first named preselected sequence and effecting thereby oscillatory rotation in the low speed mode of the permanent magnet rotor in response to its selective magnetic coupling relation with the electronically commutated greater winding turn portions; and drawing current substantially at the preselected current level through the electronically commutated greater winding turn portions to develop another torque significantly greater than the first torque during oscillatory rotation of the permanent magnet rotor in the low speed mode with the another torque being directly proportional to the current drawn by the electronically commutated greater winding turn portions, the ratio of the first named portion of the winding turns to the greater portion of the winding turns being substantially that of the ratio of the first torque to the another torque.

20. A method of operating an electronically commutated motor adapted to be energized from a DC power source in both a high speed mode and a low speed mode at a current not significantly greater than a preselected level, the electronically commutated motor including a stator with a multi-stage winding arrangement having a plurality of winding stages each with a plurality of winding turns and with at least one portion of the winding turns of at least some of the winding stages defining a tapped section thereof, and a permanent magnet rotatable assembly associated with the stator and adapted to be rotated in both the high speed mode and the low speed mode, the method comprising the steps of:

commutating the winding stages in a preselected sequence and effecting thereby the excitation of only the tapped sections of the at least some winding stages in the preselected sequence from the DC power source;

coupling the permanent magnet rotatable assembly in magnetic coupling relation with the tapped sections of the at least some winding stages excited in the preselected sequence and effecting thereby rotation in one direction of the permanent magnet rotatable assembly in the high speed mode so as to develop a first torque correlative with a current substantially at the preselected level drawn by the tapped sections of the at least some winding stages upon the excitation thereof in the preselected sequence;

commutating a greater portion of the winding turns of the winding stages in another preselected sequence different from the first named preselected sequence so as to effect the energization from the DC power source of the greater portion for the winding turns of the winding stages in the another preselected sequence;

recoupling the permanent magnet rotatable assembly in magnetic coupling relation with the greater portion of the winding turns of the winding stages excited in the another preselected sequence and effecting thereby rotation in the one direction and another direction opposite thereto of the permanent magnet rotatable assembly in the low speed mode so as to develop another torque significantly greater than the first torque and correlative with a current substantially at the preselected level drawn by the tapped sections of the at least some winding stages upon the excitation thereof in the first named preselected sequence, the ratio of the winding turns of the tapped sections of the at least some winding stages to the greater portion of the winding turns of the winding stages being substantially that of the ratio of the first torque to the another torque.

21. A method of operating an electronically commutated motor adapted to be energized from a DC power source in both a high speed mode and a low speed mode at a current not significantly greater than a preselected level, the electronically commutated motor including a stator with a multi-stage winding arrangement having a plurality of winding stages each with a plurality of winding turns and with at least one portion of the winding turns of at least some of the winding stages defining a tapped section thereof, and a permanent magnet rotatable assembly associated with the stator and the multi-stage winding arrangement, a plurality of means for selectively electronically commutating substantially all of the winding turns of the winding stages or only the tapped sections of the at least some winding stages, and switching means operable generally in at least a pair of switching modes for connecting the electronically commutating means in circuit relation with substantially all of the winding turns of the winding stages or with only the tapped sections of the at least some winding stages, respectively, the method comprising the steps of:

connecting the electronically commutating means in the circuit relation with only the tapped sections of the at least some winding stages when the switching means is in one of the switching modes thereof;

applying a control signal to the electronically commutating means to effect the energization thereof in a preselected sequence and causing thereby the excitation in the preselected sequence of only the tapped sections of the at least some winding stages from the DC power source;

coupling the permanent magnet rotatable assembly in magnetic coupling relation with the tapped sections of the at least some winding stages excited in the preselected sequence and effecting thereby rotation in one direction of the permanent magnet rotatable assembly in the high speed mode so as to develop a first torque correlative with a current substantially at the preselected level drawn by the tapped sections of the at least some winding stages upon the excitation thereof in the preselected sequence;

effecting the operation of the switching means to another of the switching modes thereof interrupting the circuit relation between the electronically commutating means and the tapped sections of the at least some winding stages and connecting the electronically commutating means in circuit relation with substantially all of the winding turns of the winding stages;

applying another control signal different from the first named control signal to the electronically commutating means to cause the energization thereof in another preselected sequence different from the first preselected sequence and effecting thereby the excitation in the another preselected sequence of substantially all of the winding turns of the winding stages from the DC power source; and recoupling the permanent magnet rotatable assembly in magnetic coupling relation with substantially all of the winding turns of the winding stages excited in the another preselected sequence and effecting thereby the rotation in the one direction and another direction opposite thereto of the permanent magnet rotatable assembly in the low speed mode so as to develop another torque significantly greater than the first torque and correlative with a current substantially at the preselected level drawn by the tapped sections of the at least some winding stages upon the excitation thereof in the first named preselected sequence, the ratio of the winding turns of the tapped sections of the at least some winding stages to substantially all of the winding turns of the winding stages being substantially that of the ratio of the first torque to the another torque.

22. A method of operating an electronically commutated motor having a stator with a plurality of winding stages carried in slots in the stator with each winding stage having a plurality of winding turns for establishing a plurality of stator poles, and a permanent magnet rotor rotatable about a central axis of the stator in response to magnetic fields of the stator poles, comprising the steps of:

developing control signals indicative of the rotational position of the rotor to control commutation of each of the winding stages in at least one preselected sequence;

electronically commutating in response to the control signals at least some of the winding stages to apply a DC voltage thereto in at least one desired sequence to drive the rotor;

energizing the motor in a high speed mode by connecting only a portion of said winding turns of the at least some winding stages to effect commutation to drive the rotor at a relatively high speed and to develop a first torque at a preselected current level; and energizing the motor in a low speed mode by connecting a predeterminately greater portion of the winding turns of each of the winding stages to effect commutation to drive the rotor at a relatively low speed and to develop a second torque predeterminately greater than the first torque at a current substantially at the preselected level, the ratio of the greater portion of winding turns to the first named portion of winding turns being substantially that of the ratio of the second torque to the first torque.

23. A method as set forth in claim 22 which further includes the step of limiting to said preselected level the current supplied to the winding stages whereby the current drawn by said winding stages when the motor is operating in either its low speed or its high speed modes will not exceed the preselected level.

24. A control circuit for an electronically commutated motor adapted to be energized from a DC power source, the motor including a stator having a multi-stage winding arrangement with a plurality of winding stages each having a first portion of winding turns and a predeterminately greater portion of winding turns, and a permanent magnet rotor associated with the stator and arranged in selective magnetic coupling relation with the winding stages so as to be rotatably driven thereby in a low speed mode and in a high speed mode; the control circuit comprising:

means for developing control signals indicative of the rotational position of the rotor;

means responsive to the control signals for electronically commutating at least some of the winding stages to apply a DC voltage thereto in a first preselected sequence to drive the rotor in one direction and in a second preselected sequence to drive the rotor in the one direction and another direction opposite thereto; and switching means adapted in the high speed mode to connect only the first portion of the winding turns of at least some of the winding stages to said commutating means to apply a DC voltage thereto in the first preselected sequence to drive the rotor at a relatively high speed in the one direction and to develop a first torque at a preselected current level, and adapted in the low speed mode to connect the predeterminately greater portion of the winding turns of each of the winding stages to said commutating means to apply a DC voltage thereto in the second preselected sequence to drive the rotor at a relatively low speed in the one direction and the another direction and to develop a second torque predeterminately greater than the first torque at a current substantially at the preselected level, the ratio of the greater portion of winding turns to the first portion of winding turns being substantially that of the ratio of the second torque to the first torque.

25. A control circuit as set forth in claim 24 which further includes means for limiting the current supplied to the winding stages to said preselected level whereby the current drawn by said winding stages when the motor is operating in either its low speed or its high speed modes will not significantly exceed the preselected level.

26. A drive for a laundry machine having means operable in a wash mode for agitating water and fabrics to be laundered thereby to wash the fabrics and operable in a spin mode for thereafter spinning the fabrics to effect centrifugal displacement of water from the fabrics, the drive comprising:
   an electronically commutated motor for driving the agitating and spinning means, said motor comprising a stator having a plurality of winding receiving slots, a plurality of winding stages carried in said slots and adapted to be commutated in at least one preselected sequence, each of said winding stages having a plurality of winding turns for establishing a plurality of stator poles, a permanent magnet rotor adapted to rotate about a central axis of said stator in response to magnetic fields of said stator poles;
   means for developing control signals indicative of the rotational position of said rotor;
   means responsive to the control signals for electronically commutating said winding stages to apply a DC voltage thereto in a unidirectional sequence during the spin mode and in an alternating sequence during the wash mode;
   switching means adapted in the spin mode to connect only a portion of said winding turns of at least some of said winding stages to said commutating means to drive said rotor unidirectionally at a relatively high speed and to develop a first torque at a preselected current level and adapted in the wash mode to connect a predeterminately greater portion of said winding turns of each of said winding stages to said commutating means to oscillate said rotor at a relatively low speed and to develop a second torque predeterminately greater than the first torque at a current substantially at the preselected level, the ratio of the greater portion of winding turns to the first named portion of winding turns being substantially that of the ratio of the second torque to the first torque; and
   means for driving the agitating and spinning means from said rotor, said driving means acting when said switching means is operated in the wash mode to effect the agitation for washing, and acting when said switching means is operated in the spin mode to effect the spinning for centrifugal displacement of water from the fabrics.

27. A laundry machine drive as set forth in claim 26 in which said electronically commutated motor further includes means for limiting the current supplied to the winding stages to said preselected level whereby the current drawn by the winding stages when the motor is operating in either its wash or spin modes will not exceed the preselected level.

28. A laundry machine drive as set forth in claim 27 wherein said agitating and spinning means comprises an agitator and a basket, the basket being unidirectionally rotatable at a high speed for spinning, the agitator being bidirectionally rotatable in the basket for effecting said agitation, and wherein the drive means comprises means for low-speed/high-torque driving of the agitator from the rotor when the switching means is in the wash mode to oscillate the agitator for washing, and for high-speed/low-torque driving of the basket from the rotor when the switching means is in the spin mode for effecting said spinning for centrifugal displacement of water from the fabrics.

29. A laundry machine drive as set forth in claim 27 wherein said driving means includes a fixed ratio speed reducer having an input driven by said rotor and an output for driving said agitating and spinning means.

30. A laundry machine drive as set forth in claim 29 wherein said agitating and spinning means comprises an agitator and a basket, the basket being unidirectionally rotatable at a high speed for spinning, the agitator being bidirectionally rotatable in the basket for effecting said agitation, and wherein the drive means comprises means for low-speed/high-torque driving of the agitator from the rotor via the speed reducer when the switching means is in the wash mode to oscillate the agitator for washing, and for high-speed/low-torque driving of the basket from the rotor via the speed reducer when the switching means is in the spin mode for effecting said spinning for centrifugal displacement of water from the fabrics.

31. A laundry machine comprising:
   means operable in a wash mode for agitating water and fabrics to be laundered thereby to wash the fabrics and operable in a spin mode for thereafter spinning the fabrics to effect centrifugal displacement of water from the fabrics;
   an electronically commutated motor for driving said agitating and spinning means, said motor comprising a stator having a plurality of winding receiving slots, a plurality of winding stages carried in said slots and adapted to be commutated in at least one preselected sequence, each of said winding stages having a plurality of winding turns for establishing a plurality of stator poles, a permanent magnet rotor adapted to rotate about a central axis of said stator in response to magnetic fields of said stator poles;
   means for developing control signals indicative of the rotational position of said rotor;
   means responsive to the control signals for electronically commutating said winding stages to apply a DC voltage thereto in a unidirectional sequence during the spin mode and in an alternating sequence during the wash mode;
   switching means adapted in the spin mode to connect only a portion of said winding turns of at least some of said winding stages to said commutating means to drive said rotor unidirectionally at a relatively high speed and to develop a first torque at a preselected current level and adapted in the wash mode to connect a predeterminately greater portion of said winding turns of each of said winding stages to said commutating means to oscillate said rotor at a relatively low speed and to develop a second torque predeterminately greater than the first torque at a current substantially at the preselected level, the ratio of the greater portion of winding turns to the first named portion of winding turns being substantially that of the ratio of the second torque to the first torque; and means for driving said agitating and spinning means from said rotor, said driving means acting when said switching means is operated in the wash mode to effect the agitation for washing, and acting when said switching means is operated in the spin mode to effect the spinning for centrifugal displacement of water from the fabrics.

32. A laundry machine as set forth in claim 31 in which the electronically commutated motor further includes means for limiting the current supplied to the winding stages to said preselected level whereby the current drawn by the winding stages when the motor is operating in either its wash or spin modes will not exceed the preselected level.

33. A laundry machine as set forth in claim 32 wherein said agitating and spinning means comprises an agitator and a basket, the basket being unidirectionally rotatable at a high speed for spinning, the agitator being bidirectionally rotatable in the basket for effecting said agitation, said drive means comprising means for low-speed/high-torque driving of the agitator from the rotor when the switching means is in the wash mode to oscillate the agitator for washing, and for high-speed/low-torque driving of the basket from the rotor when the switching means is in the spin mode for effecting said spinning for centrifugal displacement of water from the fabrics.

34. A laundry machine as set forth in claim 32 wherein said driving means includes a fixed ratio speed reducer having an input driven by said rotor and an output for driving said agitating and spinning means.

35. A laundry machine as set forth in claim 34 wherein said agitating and spinning means comprises an agitator and a basket, the basket being unidirectionally rotatable at a high speed for spinning, the agitator being bidirectionally rotatable in the basket for effecting said agitation, said drive means comprising means for low-speed/high-torque driving of the agitator from the rotor via the speed reducer when the switching means is in the wash mode to oscillate the agitator for washing, and for high-speed/low-torque driving of the basket from the rotor via the speed reducer when the switching means is in the spin mode for effecting said spinning for centrifugal displacement of water from the fabrics.

36. A method of operating a laundry machine having means operable in a wash mode for agitating water and fabrics to be laundered thereby to wash the fabrics and operable in a spin mode for thereafter spinning the fabrics to effect centrifugal displacement of water from the fabrics and an electronically commutated motor for driving the agitating and spinning means, the motor comprising a ferromagnetic stator with a plurality of winding stages carried in a plurality of stator slots and with each winding stage having a plurality of winding turns for establishing a plurality of stator poles, and a permanent magnet rotor rotatable about a central axis of the stator in response to magnetic fields of the stator poles, comprising the steps of:

developing control signals indicative of the rotational position of the rotor;

electronically commutating in response to the control signals the winding stages in a unidirectional sequence during the spin mode and in an alternating sequence during the wash mode;

energizing the motor in the spin mode by connecting only a first portion of the winding turns of at least some of the winding stages to effect commutation to drive the rotor unidirectionally at a relatively high speed and to develop a first torque at a preselected current level; and energizing the motor in the wash mode by connecting a predeterminately greater portion of the winding turns of each of the winding stages to effect commutation to oscillate the rotor at a relatively low speed and to develop a second torque predeterminately greater than the first torque at a current substantially at the preselected level, the ratio of the greater portion of winding turns to the first portion of winding turns being substantially that of the ratio of the second torque to the first torque.

37. A method as set forth in claim 36 which further includes the step of limiting to said preselected level the current supplied to the winding stages whereby the current drawn by said winding stages when the motor is operating in either its wash or its spin modes will not exceed the preselected level.

38. An electronically commutated motor adapted to be energized from a DC power source in both a high speed mode and a low speed mode at a current not significantly greater than a preselected level, the electronically commutated motor comprising:

a generally rectangular core of magnetizable material including first and second pairs of opposite sides, a plurality of corner sections of said core generally defined between adjacent ones of said opposite sides of said first and second opposite side pairs, respectively, a bore in said core and disposed in spaced relation with said first and second opposite side pairs and said corner sections, a plurality of teeth spaced about said core and having end portions defining at least in part said bore, a plurality of first pairs of slots generally of like configuration and defined between adjacent ones of said teeth with said slots of said first slot pairs being disposed generally in side-by-side relation with each other and generally adjacent said first and second opposite side pairs, respectively, a plurality of second pairs of slots of generally like configuration different from the configuration of said first slot pairs and defined between adjacent ones of said teeth with said slots of said second slot pairs being disposed generally in side-by-side relation with each other and generally adjacent said corner sections of said core, respectively, and a plurality of third pairs of slots generally of like configuration different from the configurations of said first and second slot pairs and defined between adjacent ones of said teeth with each slot of said third slot pairs being disposed in spaced apart relation between adjacent ones of said slots of each of said first and second slot pairs, respectively;

a multi-stage winding arrangement associated with said core and adapted to be electronically commutated in at least two different preselected sequences, said multi-stage winding arrangement including at least three winding stages each comprising a set of at least two coils each having a plurality of winding turns formed into a plurality of loops each spanning at least three of said teeth and with each loop having a pair of opposite side loop portions, one of said opposite side loop portions of said coils in said coil sets of two of said winding stages being received in one and the other of said slots of said first slot pairs and the other of said opposite side loop portions of said coils in said coil sets of said two winding stages sharing one and the other of said slots of said second slot pairs only with one of said opposite side loop portions of other coils in the coil set of the same winding stage, respectively, said opposite side loop portions of said coils in said coil set of a third one of said winding stages being received in one and the other of said slots of said third slot pairs and sharing said one and other slots of said third slot pairs only with one of said opposite side loop portions of other coils in said coil set of said third one winding stage, respectively, and at least three leads connected with said at least three winding stages so as to define tapped sections of only a preselected portion of said winding turns in said at least three winding stages with said tapped sections adapted to be electronically commutated in one of the at least two different preselected sequences when the electronically commutated motor is energized in its high speed mode and with at least a greater portion of said winding turns in said at least three winding stages adapted to be electronically commutated in another of the at least two different preselected sequences when the electronically commutated motor is energized in its low speed mode, respectively; and rotor means including a set of permanent magnet material elements rotatably disposed at least in part within said bore of said core and adapted for selective magnetic coupling relation with said at least three winding stages so as to be rotatably driven thereby, said rotor means being rotatably driven in one direction in the high speed mode so as to develop a torque at the preselected current level when said tapped sections of said at least three winding stages are electronically commutated in the one of the at least two different preselected sequences and said rotor means also being rotatably driven in the one direction and another direction opposite thereto in the low speed mode so as to develop another torque predeterminately greater than the first named torque when said at least greater portion of said winding turns in said at least three winding stages are electronically commutated in the another of the at least two different preselected sequences at a current substantially at the preselected level.

39. An electronically commutated motor adapted to be energized from a DC power source in both a high speed mode and a low speed mode at a current not significantly greater than a preselected level, the electronically commutated motor comprising:

a stator having a plurality of coil receiving slots therein;

a multi-stage winding arrangement associated with said stator and adapted to be electronically commutated in a plurality of different preselected sequences, said multi-stage winding arrangement including a plurality of winding stages each having a set of at least two coils each having a plurality of winding turns formed into a plurality of loops respectively having pairs of opposite side loop portions, one of the opposite side loop portions of said coils in each of said coil sets of said winding stages sharing separate ones of said slots and the other of said opposite side loop portions of said coils in said each coil set of said winding stages sharing separate other ones of said slots only with one of said opposite side loop portions of another coil of said coil set of the same winding stage, respectively, and means connected with at least some of said winding stages for defining tapped sections of only a preselected portion of winding turns in said at least some winding stages with said tapped sections adapted to be electronically commutated in one of the different preselected sequences when the electronically commutated motor is energized in its high speed mode and with at least a greater portion of said winding turns in said winding stages adapted to be electronically commutated in another of the different preselected sequences when the electronically commutated motor is energized in its low speed mode; and rotatable means including a set of permanent magnet material elements and adapted for selective magnetic coupling relation with said tapped sections of said at least some winding stages so as to be rotatably driven thereby in one direction in the high speed mode and develop a torque at the preselected current level when said tapped sections of said at least some winding stages are electronically commutated in the one different preselected sequence, said rotatable means also being adapted for selective magnetic coupling relation with said at least greater portion of said winding turns in said winding stages so as to be rotatably driven thereby in the one direction and another direction opposite the one direction in the low speed mode and develop another torque predeterminately greater than the first named torque when said at least greater portion of said winding turns in said winding stages are electronically commutated in the another different preselected sequence at a current substantially at the preselected level.

40. An electronically commutated motor adapted to be energized from a DC power source in both a high speed mode and a low speed mode at a current not significantly greater than a preselected level, the electronically commutated motor comprising:

a generally rectangular stator core having first and second pairs of opposite sides with respective adjacent opposite sides of said first and second opposite side pairs generally defining therebetween a plurality of corner sections of said stator core;

a plurality of first pairs of slots generally of like configuration arranged in said stator core generally adjacent said opposite sides of said first and second opposite side pairs, respectively;

a plurality of second pairs of slots generally of like configuration different from the configuration of said first slot pairs and arranged in said stator core generally adjacent said corner sections thereof, respectively;

a multi-stage winding arrangement associated with said stator core including a plurality of winding stages adapted to be electronically commutated in a plurality of different preselected sequences, each of said winding stages comprising at least one coil having a plurality of winding turns formed into a plurality of loops each having a pair of opposite side loop portions, one of said opposite side loop portions of said coils in two of said winding stages sharing one and the other of said slots of said first slot pairs and the other of said opposite side loop portions of said coils in said two winding stages sharing one and the other of said slots of said second slot pairs only with one of said opposite side loop portions of another coil in the same winding stage, respectively, and means connected with at least some of said winding stages for defining tapped sections of only a preselected portion of said winding turns in said at least some winding stages with said tapped sections adapted to be electronically commutated in one of the different preselected sequences when the electronically commutated motor is energized in its high speed mode and with at least a greater portion of said winding turns in said winding stages adapted to be electronically commutated in another of the different preselected sequences when the electronically commutated motor is energized in its low speed mode, respectively; and permanent magnet rotor means associated with said stator core and adapted for magnetic coupling relation with said tapped sections and said winding stages so as to be rotatably driven thereby, said permanent magnet rotor being rotatably driven in one direction in the high speed mode so as to develop a torque at the preselected current level when said tapped sections are electronically commutated in the one preselected sequence and said permanent magnet rotor being rotatably driven in the one direction and another direction opposite the one direction in the low speed mode so as to develop another torque predeterminately greater than the first named torque when said at least greater portion of said winding turns in said winding stages are electronically commutated in the another preselected sequence at a current substantially at the preselected level.

41. An electronically commutated motor as set forth in claim 40 further comprising a plurality of third pairs of slots in said stator core and having a generally like configuration different from the configurations of said first and second slot pairs with each slot of said third slot pairs being arranged between adjacent ones of said first and second slot pairs, respectively, and one of said opposite side loop portions of said coils in a third one of said winding stages sharing one of said slots of said third slot pair and the other of said opposite side loop portions of said coils in said third one winding stage sharing the other of said slots of said third slot pair only with at least one opposite side loop portion of at least another coil in said third one winding stage, respectively.

42. An electronically commutated motor as set forth in claim 41 wherein said stator core includes a plurality of teeth interposed between said slots of said first, second and third slot pairs, respectively, and said each coil in said each winding stage spanning at least three of said teeth.

43. An electronically commutated motor as set forth in claims 41 or 42 wherein said first, second and third slot pairs comprise twenty-four slots.

44. An electronically commutated motor as set forth in claim 40 wherein said winding turns in each winding stage have a terminal at each end thereof and at least one intermediate tap, said winding turns between one end terminal and said at least one intermediate tap comprising said tapped section of said winding turns in each winding stage, and said winding turns betwen said end terminals of each winding stage comprising said predeterminately greater portion thereof.

45. An electronically commutated motor as set forth in claim 40 wherein said stator is skein-wound with said winding turns being a generally U-shaped loop and wherein each of the winding stages comprises a set of a plurality of said coils.

46. An electronically commutated motor as set forth in claim 40 wherein said stator is concentrically wound with said winding turns being a complete loop of conductor and wherein each of said winding stages comprises a set of a plurality of said coils.

47. An electronically commutated motor comprising:
a generally rectangular core of magnetizable material including first and second pairs of opposite sides, a plurality of corner sections of said core generally defined between adjacent ones of said opposite sides of said first and second opposite side pairs, respectively, a bore in said core and disposed in spaced relation with said first and second opposite side pairs and said corner sections, a plurality of teeth spaced about said core and having end portions defining at least in part said bore, a plurality of first pairs of slots generally of like configuration and defined between adjacent ones of said teeth with said slots of said first slot pairs being disposed generally in side-by-side relation with each other and generally adjacent said first and second opposite side pairs, respectively, a plurality of said second pairs of slots of generally like configuration different from the configuration of said first slot pairs and defined between adjacent ones of said teeth with said slots of said second slot pairs being disposed generally in side-by-side relation with each other and generally adjacent said corner sections of said core, respectively, and a plurality of third pairs of slots generally of like configuration different from the configurations of said first and second slot pairs and defined between adjacent ones of said teeth with each slot of said third slot pairs being disposed between adjacent ones of said first and second slot pairs, respectively;

a multi-stage winding arrangement associated with said core and adapted to be electronically commutated in at least one preselected sequence, said multi-stage winding arrangement including at least three winding stages each comprising a set of at least two coils each having a plurality of winding turns formed into a plurality of loops spanning at least three of said teeth and with each loop having a pair of opposite side loop portions, one of said opposite side loop portions of said coils in said coil sets of two of said winding stages being received in one and the other of said slots of said first slot pairs and the other of said opposite side loop portions of said coils in said coil sets of said two winding stages sharing one and the other of said slots of said second slot pairs only with one of said opposite side loop portions of other coils in said coil set of the same winding stage, respectively, said opposite side loop portions of said coils in said coil set of a third one of said winding stages being received in one and the other of said slots of said third slot pairs and sharing said one and other slots of said third slot pairs only with one of said opposite side loop portions of other coils in said coil set of said third one winding stage, respectively; and rotor means rotatably disposed at least in part within said bore of said core and adapted for selective magnetic coupling relation with said at least three winding stages upon the electronic commutation thereof in the at least one preselected sequence, said rotor means including a set of permanent magnet material elements.

48. An electronically commutated motor comprising:
a generally rectangular stator core having first and second pairs of opposite sides with respective adjacent opposite sides of said first and second opposite side pairs generally defining therebetween a plurality of corner sections of said core;
a plurality of first pairs of slots generally of like configuration arranged in said stator core generally adjacent said opposite sides of said first and second opposite side pair, respectively;
a plurality of second pairs of slots generally of like configuration different from the configuration of said first slot pairs and arranged in said stator core generally adjacent said corner sections thereof, respectively;
a multi-stage winding arrangement associated with said stator core including a plurality of winding stages adapted to be electronically commutated in at least one preselected sequence, each of said winding stages comprising at least one coil having a plurality of winding turns formed into a plurality of loops defining opposite side loop portions, one of said opposite side loop portions of said coils in two of said winding stages sharing respective ones of said slots of said first slot pairs and the other of the opposite side loop portions of said coils in said two winding stages sharing respective ones of said slots of said second slot pairs only with side loop portions of another coil in the same winding stage; and
rotatable means associated with said stator core and adapted for selective magnetic coupling engagement with said winding stages upon the electronic commutation thereof in the at least one preselected sequence, said rotatable means including a set of permanent magnetic material elements.

49. An electronically commutated motor as set forth in claim 48 further comprising a plurality of third pairs of slots in said stator core and having a generally like configuration different from the configurations of said first and second slot pairs with each slot of said third slot pairs being arranged between adjacent ones of said first and second slot pairs, respectively, and one of said opposite side loop portions of said coils in a third one of said winding stages sharing one of said slots of said third slot pairs and the other of said opposite side loop portions of said coils in said third one winding stage sharing the other of said slots of said third slot pair only with one of said opposite side loop portions of another coil in said third one winding stage.

50. An electronically commutated motor as set forth in claim 49 wherein said stator core includes a plurality of teeth interposed between said slot of said first, second and third slot pairs, respectively, and said coils in each winding stage spanning at least three of said teeth.

51. An electronically commutated motor comprising:
a generally rectangular stator core having first and second pairs of opposite sides with a plurality of corner sections of said stator core defined generally by adjacent opposite sides of said first and second opposite side pairs, respectively;
a multi-stage winding arrangement associated with said stator core including a plurality of winding stages adapted to be electronically commutated in at least one preselected sequence, each of said winding stages comprising at least one coil having a plurality of winding turns formed into a plurality of loops defining pairs of opposite side loop portions disposed in said stator core, one of said opposite side loop portions of said coils in two of said winding stages being disposed in said corner sections of said stator core and the other of said opposite side loop portions of said coils in said two winding stages being disposed in said stator core adjacent said opposite sides of said first and second opposite side pairs, respectively; and
permanent magnet rotor means rotatably associated with said stator core and adapted for selective magnetic coupling relation with said winding stages upon the electronic commutation thereof in the at least one preselected sequence.

52. An electronically commutated motor as set forth in claim 51 which further includes a third winding stage comprising at least one coil having a plurality of winding turns formed into a plurality of loops defining pairs of opposite side loop portions, said side loop portions of said third winding stage being disposed adjacent said opposite side loop portions of said first and second opposite side loop pairs and spanning said corner sections of said stator core, respectively.

53. An electronically commutated motor adapted to be energized from a DC power source in both a high speed mode and a low speed mode at a current not significantly greater than a preselected level, the electronically commutated motor comprising:
a generally rectangular stator core including first and second pairs of opposite sides with adjacent opposite sides of said first and second opposite side pairs defining generally therebetween a plurality of corner sections of said stator core, respectively, a plurality of first, second and third pairs of slots in said stator core having different configurations, respectively, said first slot pairs being arranged generally along said opposite sides of said first and second opposite side pairs, respectively, said second slot pairs being arranged generally at said corner sections of said stator core, respectively, and each slot of said third slot pair being arranged between adjacent ones of said first and second slot pairs, respectively;
a multi-stge winding arrangement associated with said stator core and adapted to be electronically commutated in a plurality of different sequences, each of said winding stages comprising a plurality of coils each having a plurality of winding turns formed into a plurality of loops defining opposite side loop portions, said side loop portions of the coils in one of said winding stages sharing one of said slots of said first slot pairs and one of said slots of said second slot pairs with only side loop portions of coils of the same winding stage, said side loop portions of the coils in another of said winding stages sharing the other of said slots of said first slot pairs and the other of said slots of said second slot pairs with only side loop portions of coils of the same winding stage, and said side loop portions of coils in a third one of said winding stages sharing said slots of said third slot pairs with only side loop portions of coils of said third one winding stage, respectively, means for connection in at least some of said winding stages with a preselected portion of said winding turns thereof which are adapted to be electronically commutated in one of the different preselected sequences when the electronically commutated motor is energized in the high speed mode, and at least a greater portion of said conductor turns in said winding stages being adapted for electronic commutation in another of the different preselected sequences when the electronically commutated motor is energized in the low speed mode, respectively; and permanent magnet rotor means associated with said stator core and adapted for selective magnetic coupling relation with said winding stages so as to be rotatably driven thereby, said permanent magnet rotor means being rotatably driven in one direction in the high speed mode so as to develop a first torque at the preselected current level in response to the electronic commutation of only said preselected portion of said winding turns in said at least some winding stages in the one different preselected sequence and said permanent magnet rotor means also being rotatably driven in the one direction and another direction opposite thereto in the low speed mode so as to develop another torque predeterminately greater than the first torque in response to the electronic commutation in the another different preselected sequence of said predeterminately greater portion of said winding turns in said winding stages at a current substantially at the preselected level.

54. A laundry machine having a DC power source associated therewith comprising:

means operable generally in a wash mode for agitating water and fabrics to be laundered thereby to wash the fabrics and in a spin mode for thereafter spinning the fabrics to effect centrifugal displacement of water from the fabrics;

an electronically commutated motor adapted to be energized from the DC power source in both a high speed mode and a low speed mode through switching means at a current not significantly greater than a preselected level, said electronically commutated motor including a stator, a multi-stage winding arrangement associated with said stator and having a plurality of winding stages each with a plurality of winding turns only a first portion of which is adapted to be electronically commutated in a first preselected sequence when the electronically commutated motor is energized in the high speed mode and a predeterminately greater number of which is adapted to be electronically commutated in a second preselected sequence different from the first preselected sequence when the motor is energized in the low speed mode, means for connecting said winding stages to the switching means, the switching means being adapted to change the number of winding turns which are to be electronically commutated, and a rotor associated with said stator and arranged in selective magnetic coupling relation with said winding stages so as to be rotatably driven thereby, said rotor being rotatably driven in only one direction in the high speed mode so as to develop a first torque at the preselected current level when only said first portion of said winding turns of at least some of said winding stages is electronically commutated in the first preselected sequence and said rotor also being rotatably driven in both the one direction and another direction opposite thereto in the low speed mode so as to develop a second torque predeterminately greater than the first torque when the predeterminately greater portion of said winding turns of said winding stages in electronically commutated in the second preselected sequence at a current not significantly greater than the preselected level, the ratio of the greater portion of winding turns to the first portion of winding turns being substantially that of the ratio of the second torque to the first torque whereby said motor develops the first torque in the high speed mode and the second predeterminately greater torque in the low speed mode at currents substantially at the preselected level; and means operable generally for driving said agitating and spinning means from said rotor in both the one and another directions and in only the one direction, said driving means being operable when said electronically commutated motor is energized in its low speed mode to effect the operation of said agitating and spinning means in both the one and another directions in the wash mode thereof and also being operable when said electronically commutated motor is energized in its high speed mode to effect the operation of said agitating and spinning means in only the one direction in the spin mode thereof.

55. A laundry machine as set forth in claim 54 further comprising means operable generally in response to the rotational position of said rotor for electronically commutating said winding stages from the DC power source in the first preselected sequence to effect the spin mode of said agitating and spinning means and in the second preselected sequence to effect the wash mode of said agitating and spinning means.

56. A laundry machine as set forth in claim 55 wherein the switching means connects only said first portion of said winding turns of said at least some winding stages in circuit relation with said commutating means during the spin mode of said agitating and spinning means and connects said predeterminately greater number of said winding turns of said winding stages in circuit relation with said commutation means during the wash mode of said agitating and spinning means.

57. A laundry machine as set forth in claim 54 further comprising means for limiting the current supplied to said winding stages of said electronically commutated motor so that the current drawn thereby when said agitating and spinning means is operable in either its wash or spin modes will not significantly exceed the preselected level.

\* \* \* \* \*